(12) United States Patent
Hasegawa (10) Patent No.: US 9,457,609 B2
(45) Date of Patent: Oct. 4, 2016

(54) PAGE-TURNING APPARATUS FOR OPEN BOOK AND IMAGE PICKUP SYSTEM FOR BOOK PAGES

(71) Applicant: CASIO COMPUTER CO., LTD., Shibuya-ku, Tokyo (JP)

(72) Inventor: Hirokazu Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/666,297

(22) Filed: Mar. 23, 2015

(65) Prior Publication Data

US 2015/0375557 A1    Dec. 31, 2015

(30) Foreign Application Priority Data

Jun. 30, 2014    (JP) ................................. 2014-133450

(51) Int. Cl.
*H04N 1/04* (2006.01)
*B42D 9/04* (2006.01)
*H04N 1/00* (2006.01)

(52) U.S. Cl.
CPC ............ *B42D 9/04* (2013.01); *H04N 1/00588* (2013.01); *H04N 1/00602* (2013.01); *H04N 2201/0081* (2013.01); *H04N 2201/0434* (2013.01)

(58) Field of Classification Search
CPC ..................... H04N 1/00588; H04N 1/00602; H04N 2201/0081; H04N 2201/0434
USPC ......................................... 358/498, 497, 474
See application file for complete search history.

(56) References Cited

U.S. PATENT DOCUMENTS

| | | | | |
|---|---|---|---|---|
| 5,017,026 A | * | 5/1991 | Takesako | .................... B41J 3/28 235/379 |
| 5,798,841 A | * | 8/1998 | Takahashi | ............ H04N 1/1017 358/296 |
| 6,611,362 B2 | * | 8/2003 | Mandel | .............. H04N 1/00607 348/455 |
| 8,982,428 B2 | | 3/2015 | Hasegawa | |
| 9,056,516 B2 | | 6/2015 | Hasegawa | |
| 2003/0063335 A1 | | 4/2003 | Mandel et al. | |
| 2008/0157456 A1 | * | 7/2008 | Kimura | .................... B42D 9/06 270/4 |
| 2014/0078561 A1 | | 3/2014 | Hasegawa | |
| 2014/0168726 A1 | | 6/2014 | Hasegawa | |
| 2014/0366412 A1 | | 12/2014 | Hasegawa | |
| 2015/0174942 A1 | | 6/2015 | Hasegawa | |

FOREIGN PATENT DOCUMENTS

| | | |
|---|---|---|
| JP | 61274996 A | 12/1986 |
| JP | 05155179 A | 6/1993 |
| JP | 06016788 Y2 | 5/1994 |
| JP | 2008073873 A | 4/2008 |
| JP | 2014058053 A | 4/2014 |

OTHER PUBLICATIONS

Chinese Office Action (and English translation thereof) dated Jun. 1, 2016, issued in counterpart Chinese Application No. 201510124791.3.

* cited by examiner

*Primary Examiner* — Houshang Safaipour
(74) *Attorney, Agent, or Firm* — Holtz, Holtz & Volek PC (57) ABSTRACT

An apparatus for turning pages of an open book includes a mechanism and a roller. The mechanism turns a page held at a departure position to a destination position. The roller conveys the page from a middle point of turning operation by the mechanism to the destination position while rotating to roll up the page.

11 Claims, 7 Drawing Sheets

PAGE-TURNING APPARATUS FOR OPEN BOOK AND IMAGE PICKUP SYSTEM FOR BOOK PAGES

CROSS REFERENCE TO RELATED APPLICATION

This application is based upon and claims the benefit of priority under 35 USC 119 of Japanese Patent Application No. 2014-133450 filed on Jun. 30, 2014, the entire disclosure of which, including the description, claims, drawings and abstract, is incorporated herein by reference in its entirety.

BACKGROUND OF THE INVENTION

1. Field of the Invention

The present invention relates to an apparatus for turning pages of an open book and a system for picking up images of pages of a book.

2. Description of Related Art

Conventionally, as an automatic page-turning device to turn pages of a book or the like, there is known a page-turning device which sticks to each page of piled pages to turn pages.

The sticking to the page is released at a destination position. After the release, there is a possibility that the page returns to a departure position due to resilience of the page itself.

SUMMARY OF THE INVENTION

According to a first aspect of the present invention, there is provided an apparatus which turns pages of an open book, the apparatus includes a mechanism which turns a page held at a departure position to a destination position and a roller which conveys the page from a middle point of turning operation by the mechanism to the destination position while rotating to roll up the page.

According to a second aspect of the present invention, there is provided a system which picks up images of pages of an open book, the system includes a mechanism which holds a page at a departure position and turns the page to a destination position, a rolling guide which conveys the page from a middle point of turning operation by the mechanism to a destination position while rotating to roll up the page, and an image pickup unit which picks up an image of the page at the departure position.

According to a third aspect of the present invention, there is provided a system which picks up images of pages of an open book, the system includes a mechanism which turns a page held at a departure position to a destination position, a rolling guide which conveys the page from a middle point of turning operation by the mechanism to the destination position while rotating to roll up the page, and an image pickup unit which picks up an image of the page at the departure position.

BRIEF DESCRIPTION OF THE DRAWINGS

The present invention will become more fully understood from the detailed description given hereinafter and the appended drawings, which are given by way of illustration only and thus are not intended as a definition of the limits of the present invention, wherein.

DETAILED DESCRIPTION OF THE PREFERRED EMBODIMENT

Hereinafter, an embodiment of the present invention will be described with reference to the drawings. Though various technical limitations which are preferable to carry out the present invention are added to the after-described embodiment, the scope of the invention is not limited to the following embodiment and the illustrated examples.

Figure 1:
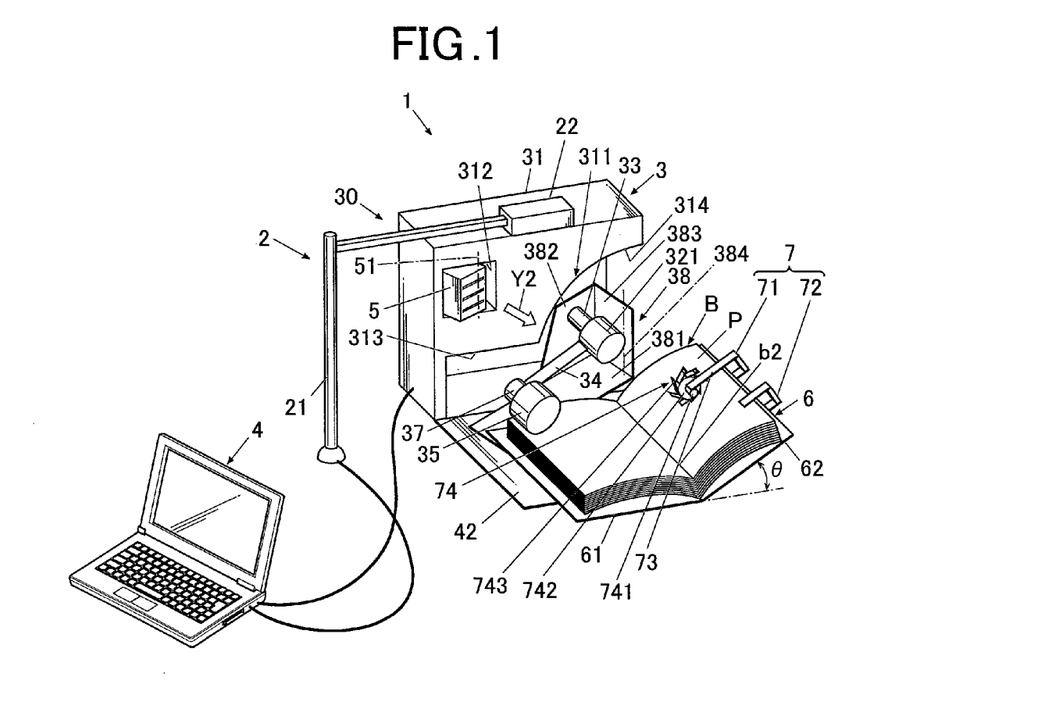
FIG. 1 is a perspective view schematically showing the configuration of a document camera system according to an embodiment of the present invention.

FIG. 1 is a perspective view schematically showing the configuration of a document camera system according to the embodiment. In the explanation hereinafter, pages P of a book B are turned from left to right.

As shown in FIG. 1, a document camera system 1 includes: a document camera 2 as an image pickup unit which picks up images of pages P of the book B; a page-turning device 3 which turns pages P of the book B; and a personal computer 4 connected to the document camera 2 and the page-turning device 3 such that the computer 4 can communicate with the document camera 2 and the page-turning device 3.

The document camera 2 includes a stand part 21 and a camera 22 attached to the upper end of the stand part 21. The stand part 21 is inclinable in the front-back direction and the left-right direction, and extensible in the up-down direction, so that a positional relationship of the book B and the camera 22 can be adjusted. A lens of the camera 22 faces downward such that the book B comes within an angle of view. A position-adjustment mechanism is disposed at the joining portion of the camera 22 and the stand part 21, so that the facing direction of the lens of the camera 22 can be adjusted.

The page-turning device 3 includes: a support base 6 which supports the book B being opened; a turning unit 30 which holds a page P at a departure position of pages P of the book B and which releases the holding of the page P at a destination position of pages P; and a page holder 7 which holds a page P at a destination position.

The support base 6 includes a couple of support plates 61, 62 (not shown in figures). The support base 6 can be folded up by using a hinge, which is not shown in drawings. When pages P of the book B are turned from left to right as shown in FIG. 1, a first support plate 61 of the support plates 61, 62 which is disposed on the left is laid on the desk, and a second support plate 62 which is disposed on the right is placed on the desk such that the second support plate 62 is inclined at a predetermined angle as if the second support plate 62 approaches the first support plate 61. Pages P at the departure position is placed on the first support plate 61, while pages P at the destination position is placed on the second support plate 62.

Thereby, the support base 6 supports the book B such that a destination position inclined angle between the pages P at the destination position and an horizontal plane is larger than a departure position inclined angle between the pages P at the departure position and the horizontal plane. Since the support base 6 can be folded up by using a hinge between the support plates 61, 62, an angle between the support plates 61, 62 is adjustable. Therefore the destination position inclined angle θ between the pages P at the destination position and the horizontal plane is adjustable. The destination position inclined angle θ is preferably adjusted to 30 to 45 degrees.

Figure 2:
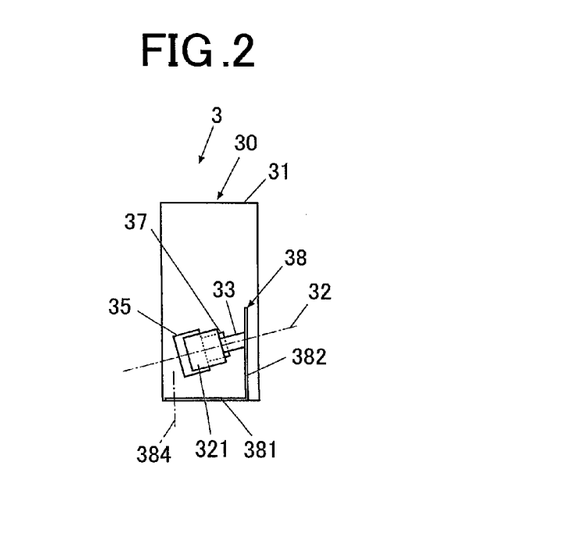
FIG. 2 is a schematic side view of the internal structure of a page-turning device according to the embodiment.

FIG. 2 is a schematic side view of the internal structure of the page-turning device 3.

With reference to FIGS. 1 and 2, the turning unit 30 includes a substantially rectangular parallelepiped case 31; a first drive unit (drive unit) 33, such as a motor, including a drive shaft 32; an arm part 34 to swing about the drive shaft 32; a sticking part 35 disposed at the tip of the arm part 34 to stick to a page P of the book B; a mount 38 supporting the first drive unit 33, the arm part 34, and the sticking part 35; a blower 5 to blow air through a region above the pages P at the departure position onto the pages P at the destination position; and a control unit 36 (not shown in FIG. 1 or 2; see FIG. 10) to control the components. The first drive unit 33, the arm part 34, and the sticking part 35 function as a page-turning mechanism according to the invention.

The case 31 accommodates the first drive unit 33, the arm part 34, the sticking part 35, the mount 38, the blower 5, and the control unit 36. The case 31 has a first recess 311 for accommodating the first drive unit 33, the arm part 34, the sticking part 35, and the mount 38, and a second recess 312 for accommodating the blower 5, on the main face of the case 31. The control unit 36 is disposed completely inside the case 31 without exposure.

The first recess 311 is composed of a first portion 313 for accommodating the arm part 34 in a standby mode, and a second portion 314 shaped not to block the swing of the arm part 34. The first portion 313 has a rectangular shape along the bottom of the case 31. The second portion 314 has an approximately fan shape, adjoins an edge of the first portion 313, and is open on one side.

The second recess 312 has a rectangular shape and is disposed above the first portion 313.

The mount 38 can be horizontally turned in the first recess 311. The mount 38 includes a bottom plate 381, a support 382 standing from the distal edge of the bottom plate 381 to support the first drive unit 33, and a stopper 383 standing from an inner edge of the bottom plate 381 and adjoining the support 382. At the edge of the bottom plate 381, a turn shaft 384 (see FIG. 1) exists about which the mount 38 can be horizontally turned. The drive shaft 32 of the first drive unit 33 supported by the support 382 is also adjacent to the edge of the bottom plate 381. In other words, the turn shaft 384 of the mount 38 is adjacent to the drive shaft 32.

Figure 3:
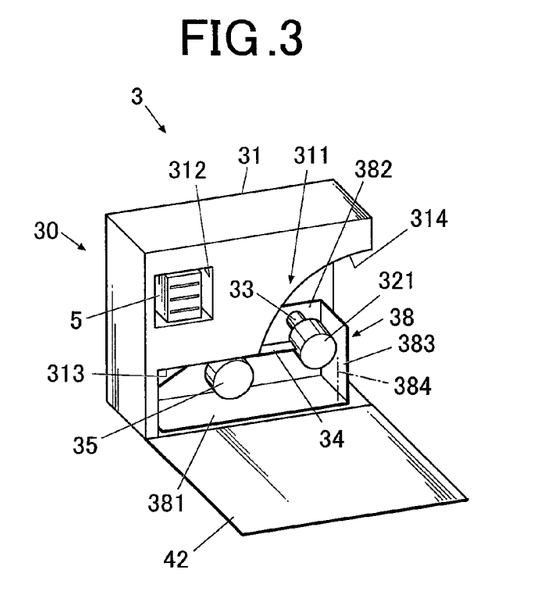
FIG. 3 is a perspective view of a mount accommodated in a case according to the embodiment.

FIG. 3 is a perspective view of the mount 38 accommodated in the case 31. In contrast, FIG. 1 illustrates the mount 38 drawn out of the case 31 (in an operating mode). If the mount 38 in the state illustrated in FIG. 1 is turned toward the case 31 about the turn shaft 384, the first drive unit 33, the arm part 34, the sticking part 35, and the mount 38 are accommodated in the first recess 311 as illustrated in FIG. 3.

The case 31 is provided with a lid 42 which is openable via a hinge (not shown) at the lower end. The open lid 42 is disposed on a desk, and the support base 6 is then mounted on the lid 42, as illustrated in FIG. 1.

When the first drive unit 33, the arm part 34, the sticking part 35, and the mount 38 are accommodated in the first recess 311, the first drive unit 33, the arm part 34, the sticking part 35, and the mount 38 can be covered by closing the lid 42.

As shown in FIG. 2, the drive shaft 32 of the first drive unit 33 in operation is inclined toward the book B side. As the drive shaft 32 rotates, the arm part 34 goes to and from (shuttle operation) between the departure position and a destination position of pages P as if the arm part 34 draws a circular arc around the drive shaft 32. In the explanation hereinafter, a movement from the departure position to the destination position of pages P is referred to as an outward movement (a motion of going), and a movement from the destination position to the departure position is referred to as a homeward movement (a motion of return).

Next, specific configurations of the arm part 34 and the sticking part 35 will be explained.

As shown in FIG. 1 and FIG. 2, the drive shaft 32 is provided with a rotor 321 at the tip. The rotor 321 is connected to the arm part 34 extending along the plane perpendicular to the drive shaft 32. The arm part 34 is a rectangular resin plate, for example. A cross section of the arm part 34 perpendicular to the longitudinal direction is shaped like a flat plate. The sticking part 35 is attached to the top end of the arm part 34 via a second drive unit 37 such as a motor.

The second drive unit 37 is disposed such that a drive shaft 39 of the second drive unit 37 is along a direction perpendicular to the longitudinal direction of the arm part 34. The sticking part 35 is removably attached to the drive shaft 39, and the sticking part 35 rotates as the drive shaft 39 rotates.

The sticking part 35 is an adhesive component having a substantially cylindrical shape. The sticking part 35 includes a columnar rotating roller and an adhesive component wound around the rotating roller.

There has been desire to improve working efficiency in replacement of the sticking parts 35 with respect to the drive shaft 39 of the second drive unit 37. Hence, the rotating roller is made of an elastic body such as a sponge, and the drive shaft 39 is fitted in the center of the rotating roller. Other than the sponge, examples of the elastic body include rubber and foam. Consequently, at the replacement, the rotating roller can be removed from the drive shaft 39 only by pulling the rotating roller to be detached from the drive shaft 39. Thus, since the rotating roller is elastic, the sticking part 35 can be easily put on and removed from the drive shaft 39, and accordingly the sticking part 35 can be easily replaced with another.

During the outward movement of the arm part 34 in the page-turning operation, the sticking part 35 sticking to a page P at the departure position conveys the page P to the destination position in response to the outward movement of the arm part 34.

During the homeward movement, the sticking part 35 releases the page P, moves along the same path but toward the opposite direction compared to the outward movement, and then sticks to another page P at the departure position. This shuttle operation is repeated to further turn the pages P.

Figure 4:
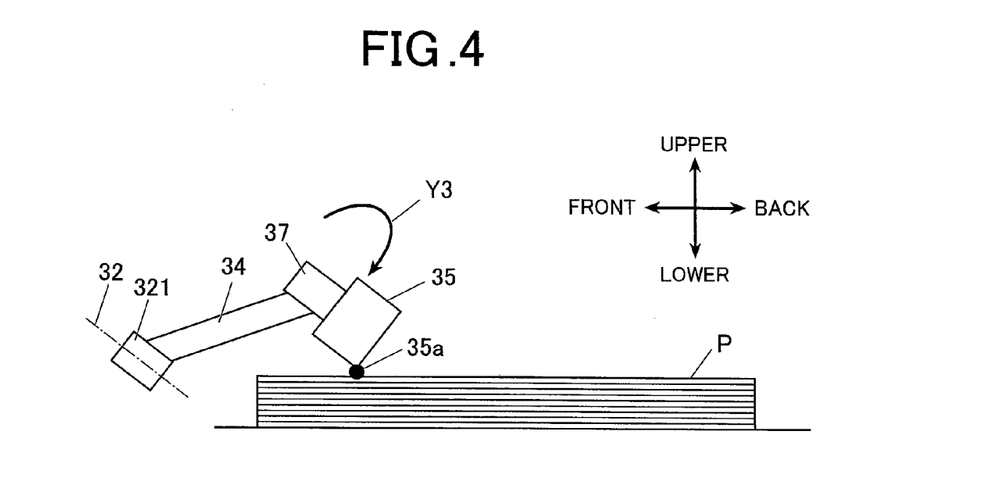
FIG. 4 is a schematic view of the initial state of a sticking part coming into contact with the topmost page at the departure position according to the embodiment.

FIG. 4 is a schematic view of the sticking part 35 at the initial stage of the contact with the page P at the departure position. As illustrated in FIG. 4, the arm part 34 moves in the direction of the arrow Y3, so that an effective (adhesive) surface of the sticking part 35 obliquely comes into contact with the page P at the departure position at the initial stage of the contact with the page P. In specific, the drive shafts 32, 39 and the arm part 34 each have a predetermined length and angle and are disposed at a predetermined position such that a part of one circumferential end portion 35a of the substantially-columnar sticking part 35 obliquely comes into contact with the page P. The effective surface of the sticking part 35 is the outer surface made of a generating line.

Since the effective surface of the sticking part 35 obliquely comes into contact with the page P, the area of the contact between the sticking part 35 and the page P at the initial stage of the contact is small. Thereby a high pressure can be applied on the page P. This ensures the sticking (adhesion) of the sticking part 35 to the page P.

Figure 5:
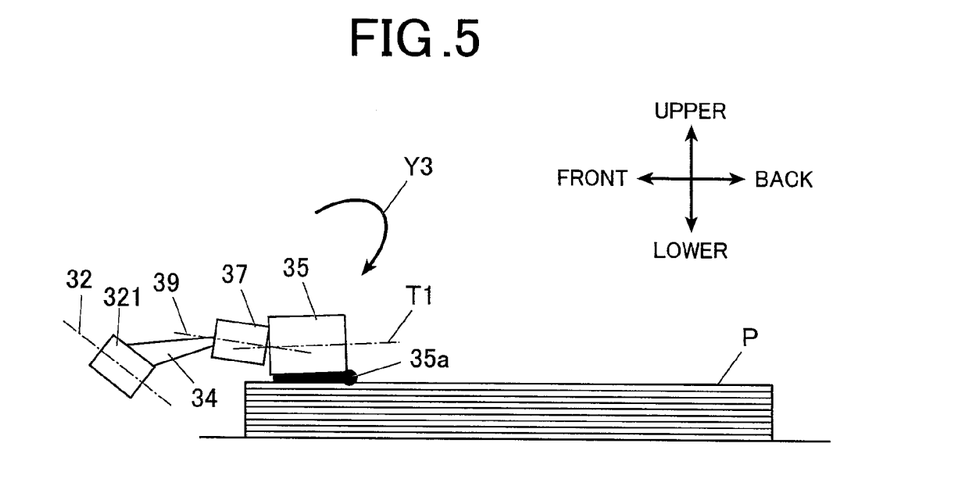
FIG. 5 is a schematic view of an arm part further moved from the state illustrated in FIG. 4.

FIG. 5 is a schematic view showing a state in which the arm part 34 has moved from the position illustrated in FIG. 4. The arm part 34 of the sticking part 35 at the initial stage of the contact with the page P at the departure position is still moved to the direction of the arrow Y3 by the first drive unit 33. Since the sticking part 35 remains in contact with the page P, the arm part 34 is twisted around its axis, which is parallel to the longitudinal direction of the arm part 34, and bows in the longitudinal direction. This causes the deformation of the rotating roller, and thereby the drive shaft 39 fitted into the rotating roller 351 is shifted from the central axis T1 of the rotating roller, so that a generating line (or a band including the generating line) of the sticking part 35 comes into close contact with the page P. The sticking part 35 is in close contact with the page P in a larger contact area than the area of the contact between the sticking part 35 and the page P at the initial stage of the contact.

Figure 6:
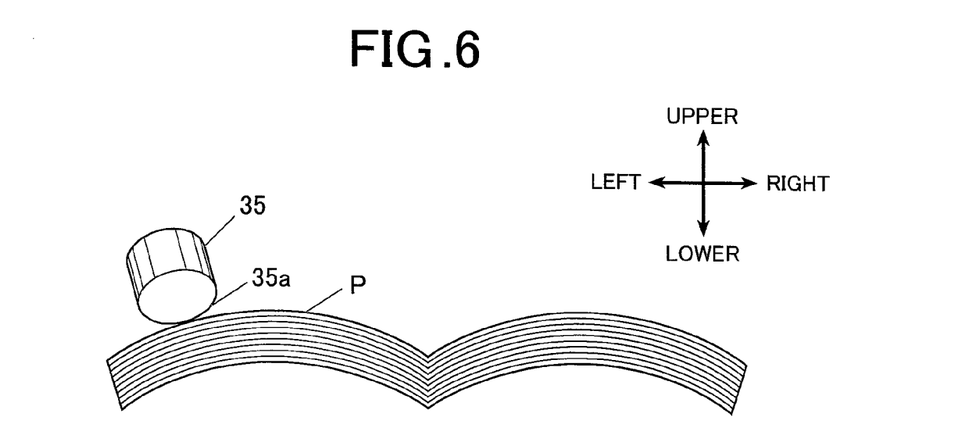
FIG. 6 is a schematic front view of the state illustrated in FIG. 4.

FIG. 6 is a schematic front view of the sticking part 35 of FIG. 4. As shown in FIG. 6, even if the page P at the departure position is warped, the effective surface of the sticking part 35 can obliquely come into contact with the page P. The area of the contact between the sticking part 35 and the page P at the initial stage of the contact is thus small. This can apply a high pressure on the page P, ensuring effective sticking of the sticking part 35 to the page P.

Such a two-step sticking operation of the sticking part 35 ensures the sticking of the sticking part 35 to the page P.

As shown in FIG. 1, the blower 5 is disposed upstream from the departure position of the book B. For example, when pages P of the book B is turned from left to right, the blower 5 is disposed on the left side of pages P which is placed at the departure position of the book B. The blower 5 is supported by the turn shaft 51 such that the blower 5 is horizontally turned about the turn shaft 51 in the second recess 312. The direction of the air from the blower 5 is thus adjustable. Alternatively, the blower 5 may be turned about two or more shafts, provided that the direction of the air is adjustable. In the use of two shafts, the blower 5 should preferably be turned in both the horizontal and vertical directions. Alternatively, the blower 5 may be installed in the second recess 312 with a pivot mechanism or any other mechanism that has a variable rotation axis.

The page holder 7 (see FIG. 1) includes a rolling guide 71 for conveying the page P to the destination position while preventing the page P from returning to the departure position, and a clip 72 for clipping the pages P at the destination position.

Figure 7:
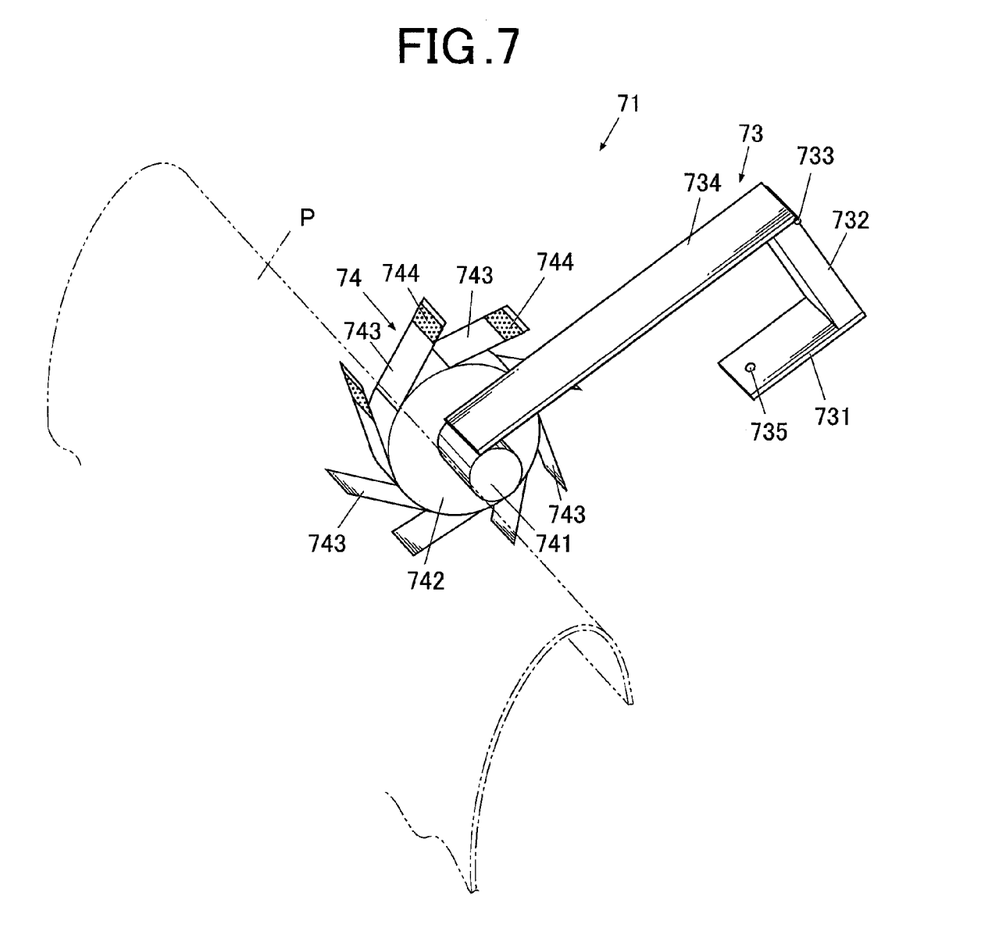
FIG. 7 is a schematic perspective view of a rolling guide according to the embodiment.
Figure 8:
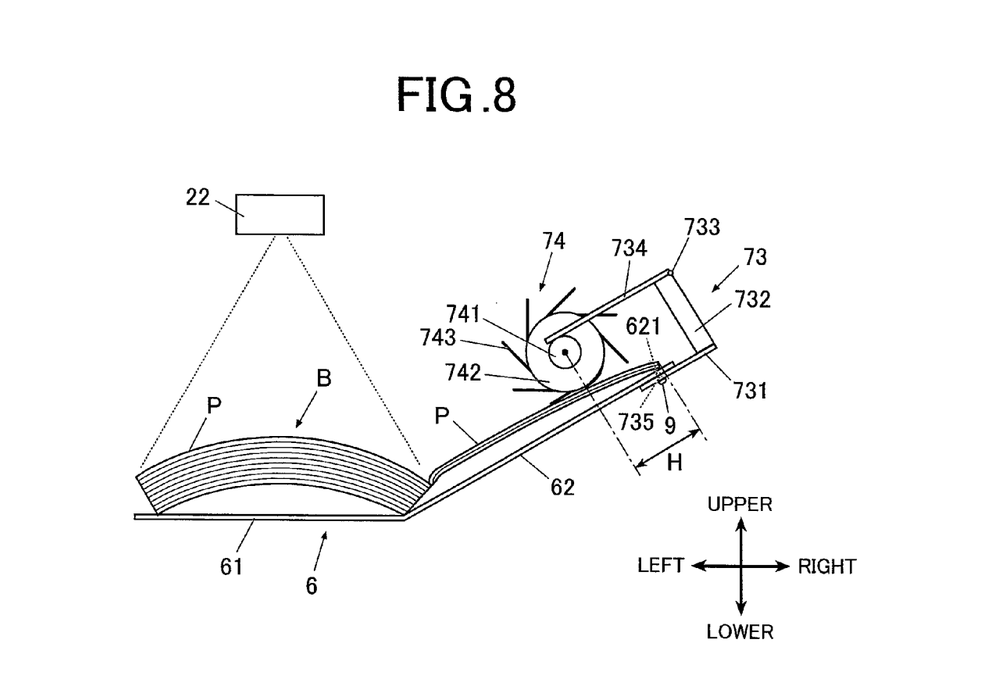
FIG. 8 is a front view of a rolling guide holding few pages P at the destination position.
Figure 9:
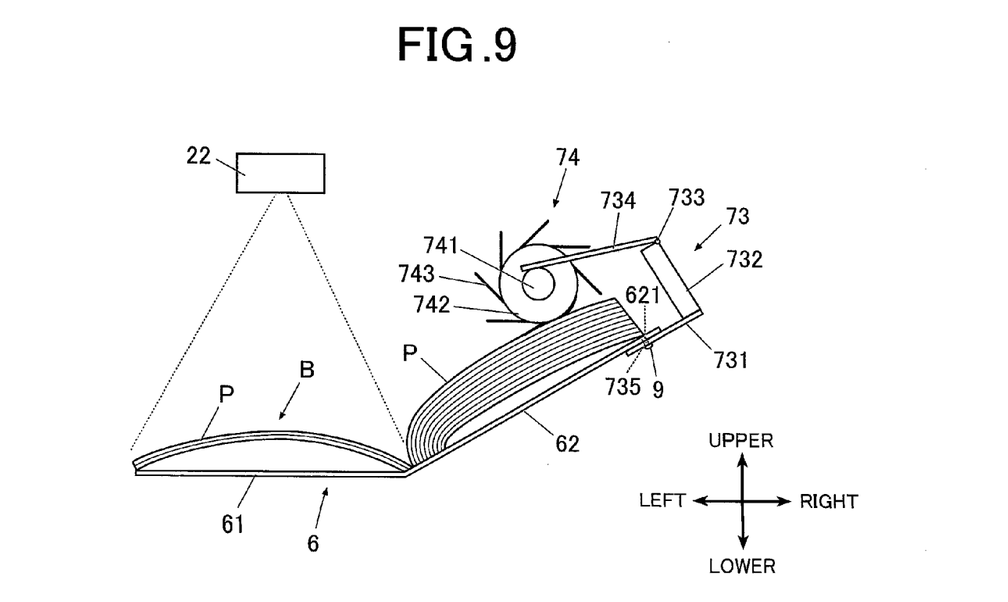
FIG. 9 is a front view of a rolling guide holding many pages P at the destination position.

FIG. 7 is a schematic perspective view of the rolling guide 71. FIG. 8 is a front view of the rolling guide 71 holding few pages P at the destination position. FIG. 9 is a front view of the rolling guide 71 holding many pages P at the destination position.

With reference to FIGS. 7 to 9, the rolling guide 71 includes a supporting unit 73 fixed to the second support plate 62, and a rotation drive unit 74 supported by the supporting unit 73.

The supporting unit 73 includes a fixed plate 731 fixed to the bottom of the second support plate 62, a pillar 732 extending perpendicularly to the fixed plate 731, and an adjustable member 734 (movable supporting arm) that faces the fixed plate 731 and is movably coupled to the tip of the pillar 732 with a hinge 733. The adjustable member 734 is movable in the thickness direction and moves according to the total thickness of the pages P at the destination position, as illustrated in FIGS. 8 and 9. The rotation drive unit 74 thus can be disposed at an optimal position regardless of the total thickness of the pages P at the destination position.

The fixed plate 731 has a through hole 735 for fixation. The bottom of the second support plate 62 has multiple screw holes 621 arranged in the front-back direction and in the left-right direction on a grid. The through hole 735 is coupled to one of the screw holes 621 with a screw 9 to fix the fixed plate 731 to the second support plate 62. The position of the rolling guide 71 relative to the pages P at the destination position can be adjusted by changing the screw hole 621 to install the screw 9.

The fixed plate 731 may be fixed to the second support plate 62 though any means other than the screw 9, provided that the position of the fixed plate 731 is adjustable. For example, the fixed plate 731 may be fixed to the second support plate 62 with a band or magnets.

The rotation drive unit 74 includes a motor 741 mounted on the tip of the adjustable member 734, and a disk roller 742 connected to the rotary shaft of the motor 741 so as to be rotated by the motor 741.

The outer periphery of the roller 742 can abut on the topmost page P at the destination position. The roller 742 is rotated by the motor 741 to roll up a page P and convey the page P to the destination position. The roller 742 has multiple vanes 743 on the outer periphery at predetermined intervals along the circumferential direction to roll up the page P. Each vane 743 is a flexible plate composed of a resin, such as PET. The vanes 743 under no load extend along tangents to the roller 742. Each vane 743 has a sheet 744 at the tip and on the surface to come into contact with the page P. The sheet 744 is composed of a material, such as a rubber, having higher frictional resistance than that of the page P.

The roller 742 is disposed at a middle point of the path of the page P from the departure position to the destination position during the page-turning operation. The roller 742 thus rolls up the page P by its rotation. The vanes 743 are also rotating during this operation. The sheets 744 of the vanes 743 can thus catch the page P and certainly convey the page P even if the path of the page P deviates.

After the release of the page P from the sticking part 35 at the destination position, the rotating roller 742 also acts on the page P and thus can prevent the page P from returning to the departure position.

Figure 10:
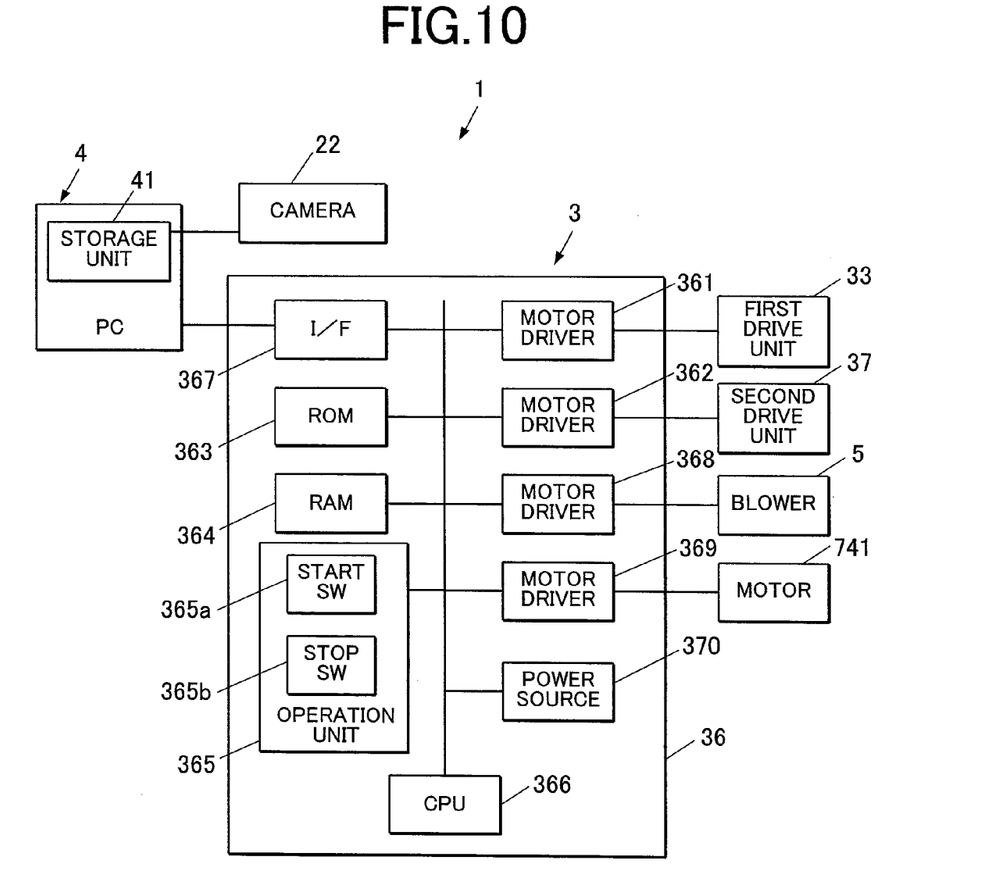
FIG. 10 is a block diagram showing the main control configuration of the document camera system according to the embodiment.

Next, the main control configuration of a document camera system 1 according to the embodiment will be explained. FIG. 10 is a block diagram showing the main control configuration of the document camera system 1. As shown in FIG. 10, the control unit 36 of the page-turning device 3 includes: a motor driver 361 which drives the first drive unit 33; a motor driver 362 which drives the second drive unit 37; a motor driver 368 which drives the blower 5; a motor driver 369 which drives the motor 741; a ROM 363 where a variety of programs are stored; a RAM 364 where the programs stored in the ROM 363 are opened when the programs are executed; an operation unit 365 where a variety of instructions are inputted; a CPU 366 which controls the motor drivers 361 and 362 by opening and executing the programs, which are stored in the ROM 363, in the RAM 364 on the basis of the instructions from the operation unit 365; an I/F 367 to which the computer 4 is connected; and a power source 370.

The operation unit 365 includes a start switch 365a for starting page-turning processing and a stop switch 365b for stopping the page-turning processing.

Figure 11:
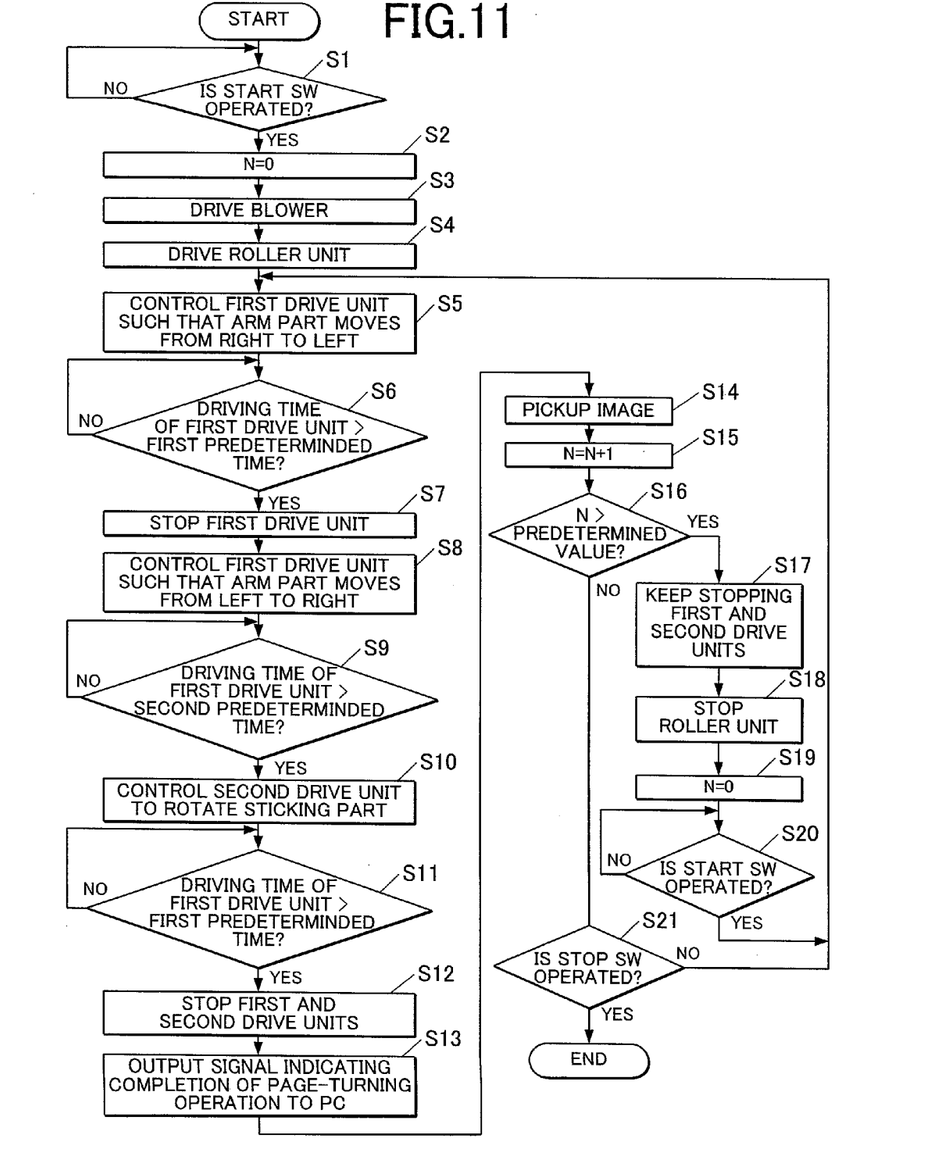
FIG. 11 is a flowchart of page-turning processing by the page-turning device of the embodiment.

An image-reading method by the document camera system 1 will be explained hereinafter. FIG. 11 is a flowchart of the page-turning processing.

First, preparation before execution of the page-turning processing will be explained.

A user opens the lid 42 of the turning unit 30 in a standby mode, and then turns the mount 38 about the turn shaft 384 to draw out the mount 38 from the case 31 and thus activate the arm part 34 (see FIG. 1). The user then disposes the support base 6 on the open lid 42, and places the book B on the support base 6.

After the placement of the book B, the user prepares the page holder 7. In specific, the user fastens the front cover of the book B to the second support plate 62 with the clip 72. The user also fixes the supporting unit 73 of the rolling guide 71 to the second support plate 62 at an appropriate position. The position of the supporting unit 73 should preferably be adjusted such that the distance H from the lateral edge of the topmost page P (in the initial state, the front cover of the book B fastened to the second support plate 62) at the destination position to the center of the rotation of the roller 742 is within the range of 5 to 10 mm, as illustrated in FIG. 8.

The user then adjusts the direction of the air from the blower 5 such that the air flows through a region above the pages P at the departure position onto the pages P at the destination position. The direction of the air is indicated by an arrow Y2 in FIG. 1. In specific, the air from the blower 5 should preferably be directed to near the point of contact between the roller 742 and the topmost page P at the destination position.

The user then preliminarily adjusts the position of the arm part 34 such that the sticking part 35 is aligned to the start point (the end point of the homeward movement). In specific, the user further adjusts the position of the support base 6 such that the sticking part 35 abuts on the upper left portion of the page P at the departure position (see FIG. 1).

The user then opens the book B to expose the page P previous to the first page P to be scanned, and moves the sticking part 35 to the end point of the outward movement (the start point of the homeward movement).

The user also adjusts the position of the camera 22 such that the page P at the departure position is within the angle of view of the camera 22.

Thus the preparation is done, and when the user turns on the power source of the page-turning device 3, the CPU 366 opens in the RAM 364 a program for the page-turning processing stored in the ROM 363 to execute the program.

As shown in FIG. 11, at Step S1, the CPU 366 determines whether or not the start switch 365a is operated by the user. When determining that the start switch 365a is not operated, the CPU 366 keeps the state as it is. When determining that the start switch 365a is operated, the CPU 366 shifts the processing to Step S2.

At Step S2, the CPU 366 resets the value N, which is stored in the RAM 364, at zero.

At Step S3, the CPU 366 drives the blower 5 to carry out blowing with the blower 5.

At Step S4, the CPU 366 drives the motor 741 to rotate the roller 742.

At Step S5, the CPU 366 controls the first drive unit 33 such that the arm part 34 moves from right to left (homeward movement).

At Step S6, the CPU 366 determines whether or not a driving time of the first drive unit 33 exceeds a first predetermined time. When determining that the driving time does not exceed the first predetermined time, the CPU 366 keeps driving the first drive unit 33. When determining that the driving time exceeds the first predetermined time, the CPU 366 shifts the processing to Step S6. The first predetermined time is set at a time length enough for the arm part 34 to move from the start point to the end point of the homeward movement.

At Step S7, the CPU 366 stops the first drive unit 33. Thereby, the sticking part 35 sticks to a page P on the left with rotation of the sticking part 35 stopped (see FIG. 1).

At Step S8, the CPU 366 controls the first drive unit 33 such that the arm part 34 moves from left to right (outward movement). In response to this control, the page P starts to be turned from the departure position to the destination position while sticking to the sticking part 35.

At Step S9, the CPU 366 determines whether or not a driving time of the first drive unit 33 exceeds a second predetermined time. When determining that the driving time does not exceed the second predetermined time, the CPU 366 keeps driving the first drive unit 33. When determining that the driving time exceeds the second predetermined time, the CPU shifts the processing to Step S10. The second predetermined time is set at a time (time length) shorter than the first predetermined time. In particular, it is preferable that the second predetermined time period is set from a time for the arm part 34 to move from the start point to around the middle point of the outward movement to a time for the arm part 34 to move from the start point to almost the endpoint of the outward movement.

At Step S10, the CPU 366 controls the second drive unit 37 to rotate the sticking part 35 while keeping driving the first drive unit 33. This rotation changes the adhesive power of the sticking part 35 when the sticking part 35 separates from a page P, so that the sticking part 35 can reliably separate from the page P. The arm part 34 rotates clockwise in the outward movement. In order to improve the separation performance, it is preferable that the second drive unit 37 rotate the sticking part 35 in a direction opposite to the swing direction of the arm part 34, i.e. counterclockwise.

At Step S11, the CPU 366 determines whether or not the driving time of the first drive unit 33 exceeds the first predetermined time. When determining that the driving time does not exceed the first predetermined time, the CPU 366 keeps driving the first drive unit 33 and the second drive unit 37. When determining that the driving time exceeds the first predetermined time, the CPU 366 shifts the processing to Step S12.

The sticking page P is separated from the sticking part 35 while the second drive unit 37 rotates. The air from the blower 5 flows onto the page P released from the sticking part 35, and thus can guide the page P to the destination position while preventing the page P from returning to the departure position. The sticking part 35 is located at a position apart from pages P of the destination position with no page P sticking thereto. The sticking part 35 and the arm part 34 at this position are outside the angle of view of the camera 22.

The page P is turned from the departure position to the destination position in Steps S8 to S11. The vanes 743 of the roller 742 rotating at a middle point of the path catch the page P and guide it to the outer periphery of the roller 742. The page P is then rolled up by the roller 742 and is conveyed to the destination position. The rotating roller 742 holds the page P at the destination position in the subsequent steps of the page-turning operation since the roller 742 keeps rotating.

In Step S12, the CPU 366 stops the first drive unit 33 and the second drive unit 37. The stopper 383 limits the clockwise rotation of the arm part 34 caused by the inertial force.

At Step S13, the CPU 366 outputs a signal which indicates completion of the page-turning processing to the computer 4.

At Step S14, the computer 4 controls the camera 22 on the basis of the inputted signal which indicates completion of the page-turning operation so that the page at the departure position between the pages P opened at present is imaged (image pickup). At the time, since the sticking part 35, the arm part 34, the blower 5 and the page holder 7 are outside the angle of view of the camera 22, only the page P at the departure position is imaged. Picked-up image data generated by the camera 22 are numbered one by one (each imaging) and stored in a storage unit 41 of the computer 4. For example, in a case where only odd-numbered pages are imaged as pages P at the departure position, even-numbered pages P are also placed at the departure position to capture images on even-numbered pages, and all the pages are collated in numerical order to make one scanned image.

At Step S15, the CPU 366 adds one to the value N and stores the result in the RAM 364. The CPU 366 and the RAM 364 thus function as a counter for counting the number of page-turning operations according to the invention.

In Step S16, the CPU 366 determines whether the value N is a predetermined value. If the value N is the predetermined value; then the process goes to Step S17; otherwise the process goes to Step S21. The predetermined value indicates the maximum number of pages P that can be stably rolled up by the roller 742, and varies depending on the type of the paper of the pages P and the size of the book B. According to the embodiment, the predetermined value is 50, for example.

In Step S17, the CPU 366 keeps stopping the first drive unit 33 and the second drive unit 37.

In Step S18, the CPU 366 stops the motor 741 to inactivate the roller 742.

In Step S19, the CPU 366 resets the value N stored in the RAM 364 to 0.

After the inactivation of the roller 742, the user re-prepares the page holder 7. In specific, the user fastens the pages P at the destination position to the second support plate 62 with the clip 72. The user also adjusts the position of the supporting unit 73, such that the distance H from the lateral edge of the topmost page P at the destination position to the center of the rotation of the roller 742 is within the range of 5 to 10 mm. After the re-preparation, the user operates the start switch 365a.

In Step S20, the CPU 366 determines whether the user operates the start switch 365a. If the user operates the start switch 365a; then the process goes to Step S5; otherwise the CPU 366 maintains the current mode.

In Step S21, the CPU 366 determines whether the user operates the stop switch 365b. If the user operates the stop switch 365b; then the CPU 366 terminates the page-turning processing; otherwise the process goes to Step S5. The page-turning operation and the image pickup operation are thus repeated to complete the image pickup of target pages P.

According to the embodiment, the rotating roller 742 rolls up a page P at a middle point of the path and conveys the page P to the destination position, as described above. The rotating roller 742 thus can prevent the page P at the middle point from returning to the departure position during the page-turning operation. The rotating roller 742 also acts on the page P and thus can prevent the page P from returning to the departure position after the release of the page P from the sticking part 35 at the destination position. The pages P can thus be certainly turned.

The vanes 743 disposed on the outer periphery of the roller 742 to roll up the page P can catch the page P and guide it to the outer periphery of the roller 742. Rotation of the rotating roller 742 can thus certainly act on the page P.

The vanes 743, which are flexible, warp to fit the shape of the page P and can thus certainly catch the page P. The sheets 744, which are provided at the tips of the vanes 743 and have higher frictional resistance than that of the page P, do not readily release the page P once the sheets 744 come into contact with the page P. The vanes 743 can thus continuously hold the page P.

If the number of turning of the pages P reaches the predetermined value, the first drive unit 33, the second drive unit 37, and the motor 741 are stopped to halt the page-turning operation and the rotation of the roller 742. During the halt mode, the user can readjust the position of the page holder 7 to an optimal position relative to the pages P accumulated at the destination position.

The position of the roller 742 is adjustable relative to the pages P at the destination position. In other words, the roller 742 can be shifted to an optimal position depending on the type and thickness of the book B. The roller 742 can also be shifted during the page-turning operation.

The position of the roller 742 in the thickness direction varies depending on the total thickness of the pages P at the destination position. In other words, the roller 742 can be shifted to a position corresponding to the total thickness of the pages P at the destination position.

The blower 5 blows air onto the page P at a middle point of the path. The page P can thus be smoothly conveyed to the destination position with minimum effect of the blowing air on the pages P at the departure position.

Since the direction of the air from the blower 5 is adjustable, the air can be directed to an optimal position according to the size and thickness of the book B. Examples of the optimal position include the point of contact between the roller 742 and the topmost page P at the destination position. The air directed to the point can prevent the page P conveyed toward the destination position from bending.

Further, since the turning unit (the first drive unit 33, the arm part 34 and the sticking part 35) and the roller 742 are outside the angle of view of the camera 22 when the camera 22 images the pages P, the turning unit and the roller 742 are prevented from getting into the images, so that appropriate images can be obtained.

The invention is not limited to the above embodiment, and several modifications can be applied thereto appropriately.

In the above embodiment, the sticking part 35 has the adhesive component, and the sticking part 35 sticks to a page P by the adhesive power of the adhesive component. However, it is also possible that the sticking part 35 sticks to a page P by suction etc. In this case, for example, a communicating hole which communicates with an inner space of the sticking part 35 is formed on the circumference surface of the sticking part 35 so that the inner space of the sticking part 35 and a pump communicate with each other, and by driving the pump such that the inner space is under negative pressure, sucking power acts onto the communicating hole.

Thereby, the sticking part 35 can stick to a page P by the suction power.

Other than suction and adhesion, sticking by electrostatic attraction can be applied to the sticking part 35.

The document camera 2 is separated from the page-turning device 3 in the embodiment. Alternatively, the document camera may be accommodated in the case.

The roller 742 has multiple vanes 743 on the outer periphery in the embodiment. Alternatively, the roller 742 may lack such vanes. In this case, the roller 742 should preferably have a non-slip surface to readily roll up the page P.

Alternatively, the roller 742 may have a single vane instead of the multiple vanes 743.

The above-described embodiments should not be construed to limit the invention. The scope of the invention is defined by the following claims and equivalents thereof.

What is claimed is:

1. An apparatus which turns pages of an open book comprising:
   a mechanism which turns a page held at a departure position to a destination position; and
   a roller which conveys the page from a middle point of a turning operation by the mechanism to the destination position and holds the page at the destination position while rolling up the page.

2. The apparatus according to claim 1, wherein the roller has a vane for rolling up the page on an outer periphery of the roller along a circumferential direction of the roller.

3. The apparatus according to claim 2, wherein the vane is flexible and is provided with a sheet at a tip of the vane, the sheet comprising a material having higher frictional resistance than that of the page.

4. The apparatus according to claim 1, further comprising:
   a counter which counts a number of page-turning operations by the mechanism; and
   a control unit which controls the mechanism and the roller,
   wherein when the number counted by the counter reaches a predetermined value, the control unit stops the mechanism and the roller.

5. The apparatus according to claim 1, wherein a position of the roller is adjustable relative to pages at the destination position.

6. The apparatus according to claim 1, wherein a position of the roller varies in a thickness direction of the book depending on a thickness of pages at the destination position.

7. The apparatus according to claim 1, further comprising a blower to blow air onto the page at the middle point of the turning operation.

8. The apparatus according to claim 7, wherein a direction of the air from the blower is adjustable.

9. A system which picks up images of pages of an open book, the system comprising:
   a mechanism which holds a page at a departure position and turns the page to a destination position;
   a rolling guide which conveys the page from a middle point of a turning operation by the mechanism to a destination position and holds the page at the destination position while rolling up the page; and
   an image pickup unit which picks up an image of the page at the departure position.

10. A system which picks up images of pages of an open book, the system comprising:
    a mechanism which turns a page held at a departure position to a destination position;
    a rolling guide which conveys the page from a middle point of a turning operation by the mechanism to the destination position and holds the page at the destination position while rolling up the page; and
    an image pickup unit which picks up an image of the page at the departure position.

11. The system according to claim 10, wherein the mechanism and the rolling guide are out of an angle of view of the image pickup unit during image pickup by the image pickup unit.

* * * * *